UNITED STATES PATENT OFFICE.

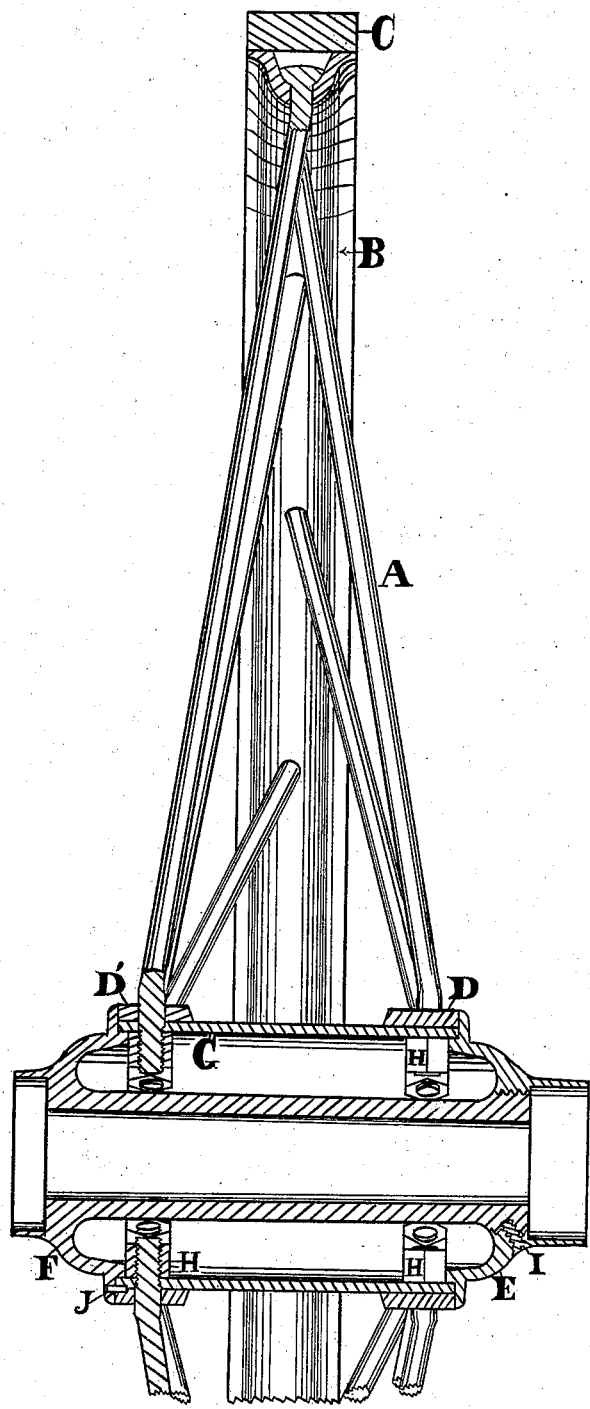

FRANK A. HILL, OF SAN LEANDRO, CALIFORNIA.

IMPROVEMENT IN VEHICLE-SPRINGS.

Specification forming part of Letters Patent No. 216,956, dated July 1, 1879; application filed February 12, 1879.

*To all whom it may concern:*

Be it known that I, FRANK A. HILL, of San Leandro, in the county of Alameda and State of California, have invented a new and useful Improvement in Wagon-Wheels, of which the following is a specification.

My invention relates to the construction of wheels made wholly of metal; and the object of the invention is to render the parts at the same time simple in construction and strong and durable, and to permit the box, when worn, to be easily and cheaply replaced by a new one without loosening or detaching any portion of the hub, that would loosen the spokes or affect the strength of the other parts of the wheel.

It consists of certain improvements in the details of construction herein fully set forth, and specifically pointed out in the claims.

The accompanying drawing shows a central transverse section of the hub and part of the wheel, a portion of the spokes, felly, and tire being represented as they would appear in a scale drawn on the same plane.

The shell of the hub through which the spokes pass is represented at G. It is re-enforced by bands D D', which surround the said shell near its ends, through which also the spokes A pass.

The box or bushing is represented at F, in which the axle of the wagon runs. It has a cap, E, screwed upon one end corresponding to a fixed cap on the opposite end.

The spokes are formed at the outer end with heads, which rest in a grooved felly, B, formed, as shown, to receive them. This felly is covered by a tire, C, of ordinary material and construction. The inner ends of these spokes are held underneath or within the shell G by nuts H, the shell being made of a size in relation to the bushing to give space for the said nuts. The spokes being inserted in place through the felly, the rings, and the shell, the nuts are applied and the proper strain put upon the parts.

The caps are formed with flanges, as shown, to fit the ends of the shell, and when the parts are in position the box may be inserted and the cap E screwed to its place and secured by the set-screw I.

The pin J connects the cap and the bushing and prevents the parts from turning independently of each other.

I am aware that hubs or boxes have been heretofore shown formed to receive an outer shell, with one fixed and one removable cap; and I am also aware that grooved fellies and spokes held to the hubs by means of nuts beneath the outer shell are not new, and I therefore limit my claims in view of the admitted state of the art.

Having thus described my invention, what I claim, and desire to secure by Letters Patent, is—

1. A removable box, F, having a fixed and a removable flanged cap, in combination with the shell G and spokes A, said spokes having heads resting in a grooved felly and held by adjusting-nuts H within the shell G, the parts being all constructed and arranged as and for the purpose set forth.

2. The combination of the removable box F, having fixed and removable flanged caps, with the shell G and the rings D D', and with the spokes A, passing through said rings and shell, and held adjustably beneath the shell by the nuts H, as and for the purpose set forth.

FRANK A. HILL.

Witnesses:
ED. P. PALMER,
JACOB PRICE.

Correction in Letters Patent No. 216,956.

It is hereby certified that the subject-matter for which these Letters Patent are granted, is erroneously stated in the Letters Patent proper, in the heading to the drawings, and in the caption of the printed specification, to be "Vehicle-Springs." It should be *Vehicle-Wheels*, to agree with the real invention set forth, and with the original papers of record in this Office.

Aug. 16, 1879.